United States Patent [19]

Landry

[11] 4,254,695
[45] Mar. 10, 1981

[54] COVER FOR USE ON A TOASTER

[76] Inventor: Jean-Guy Landry, 5999 Auteuil Ave., Brossard, Quebec, Canada, J4Z 1N1

[21] Appl. No.: 40,188

[22] Filed: May 18, 1979

[51] Int. Cl.³ ............................................. A47J 37/08
[52] U.S. Cl. ..................................... 99/334; 99/337; 99/391
[58] Field of Search ...................... D7/91, 92, 93, 131; 99/337, 334, 335, 326, 327, 328, 329 R, 391, 389, 390, 392, 325, 385, 339

[56] References Cited

U.S. PATENT DOCUMENTS

| D. 201,415 | 6/1965 | Grant | 99/385 X |
| 1,942,835 | 1/1934 | Rutenber | 99/335 |
| 2,053,935 | 9/1936 | Austin | 99/339 |
| 2,194,859 | 3/1940 | Malmquist | 99/328 |
| 2,211,024 | 8/1940 | Nardin | 99/339 |
| 2,382,380 | 8/1945 | Buttner | 99/392 |
| 2,504,445 | 4/1950 | Pavnica | 99/339 |
| 2,764,081 | 9/1956 | Glasser | 99/390 |
| 3,298,300 | 1/1967 | Grebow | 99/337 |
| 3,760,713 | 9/1973 | Sato | 99/391 |
| 3,789,749 | 2/1974 | Paaskesen | 99/391 |

Primary Examiner—Billy J. Wilhite

[57] ABSTRACT

A cover for use on a toaster is disclosed. The cover serves to minimize heat losses and comprises a plate slightly smaller in size than the top of the toaster, and means for hingedly mounting the plate on the top of the toaster, so as to cover the bread slots. The plate is preferably embossed in the shape of an inverted pan, so as to leave a predetermined space between the embossed portion of the cover and the top of the toaster.

1 Claim, 3 Drawing Figures

COVER FOR USE ON A TOASTER

This invention relates to a cover for use on a toaster for minimizing heat losses to the regular bread slots of a toaster, and also reduce the time required for toasting bread.

BACKGROUND OF THE INVENTION

The regular household toasters are conventionally equipped with top bread slots for receiving slices of bread and with means for automatically raising the slices of bread when properly toasted. A substantial amount of heat escapes through the bread slots during toasting, with the result that more than the required amount of energy is spent for toasting the bread. In addition, the time required for toasting the bread is longer than would normally be needed. In view of today's great need for saving energy as much as possible, it would be desirable to try to cut down the energy loss to a minimum, and this would certainly include any energy lost through the use of household appliances.

SUMMARY OF THE INVENTION

It is therefore the object of the present invention to reduce the amount of heat loss to the bread slots of a toaster by providing a cover for such bread slots.

The cover for a toaster in accordance with the invention comprises a plate slightly smaller size than the top of the toaster, and means for hingedly mounting said plate on the top of the toaster, so as to cover the bread slots of the toaster. The cover is light enough to partially open under the push exerted by the toasts when ejected by the toast-ejecting mechanism of the toaster.

The plate is preferably embossed in the shape of an inverted pan, so as to leave a predetermined air space between the embossed portion of the cover and the top of the toaster. The cover is preferably made of two metal layers with heat-insulating material sandwiched therebetween.

The means for hingedly mounting the plate on the top of the toaster preferably includes a stop for holding the cover slightly past its equilibrium position when open, so as to prevent the cover from swinging all the way back.

In accordance with a preferred embodiment of the invention, means are coupled with the conventional toast-ejecting mechanism of the toaster for opening the cover when the toasts are ejected.

SHORT DESCRIPTION OF THE DRAWINGS

The invention will now be disclosed, by way of example, with reference to a preferred embodiment, in which.

DETAILED DESCRIPTION OF A PREFERRED EMBODIMENT

Figure 1:
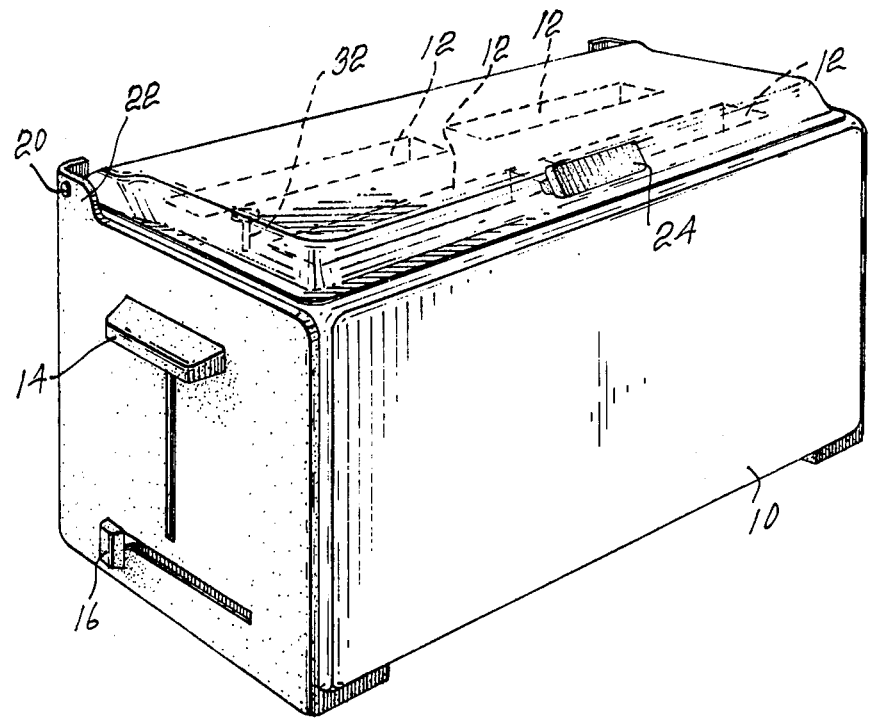
FIG. 1 illustrates a perspective view of a toaster equipped with a cover in accordance with the invention.
Figure 2:
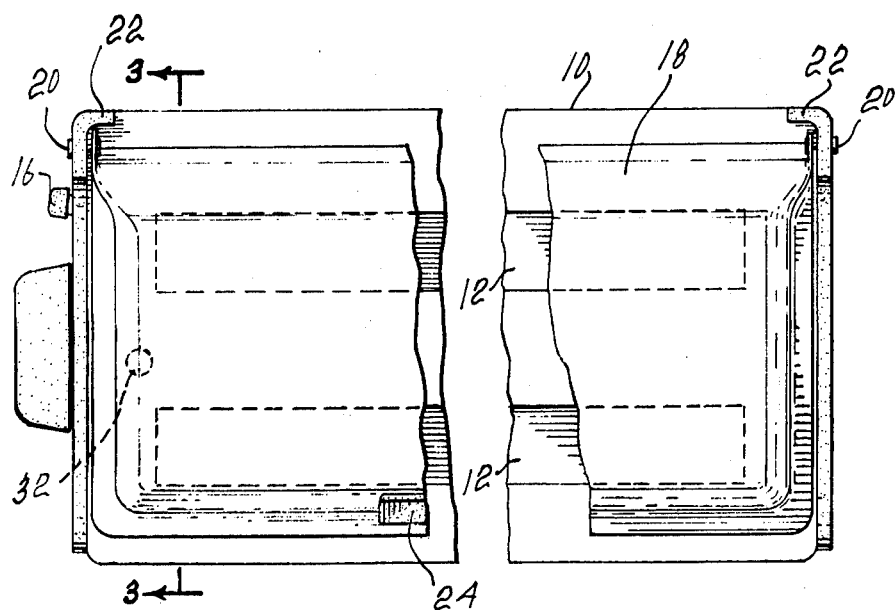
FIG. 2 illustrates a broken away, top view of the arrangement illustrated in FIG. 2.
Figure 3:
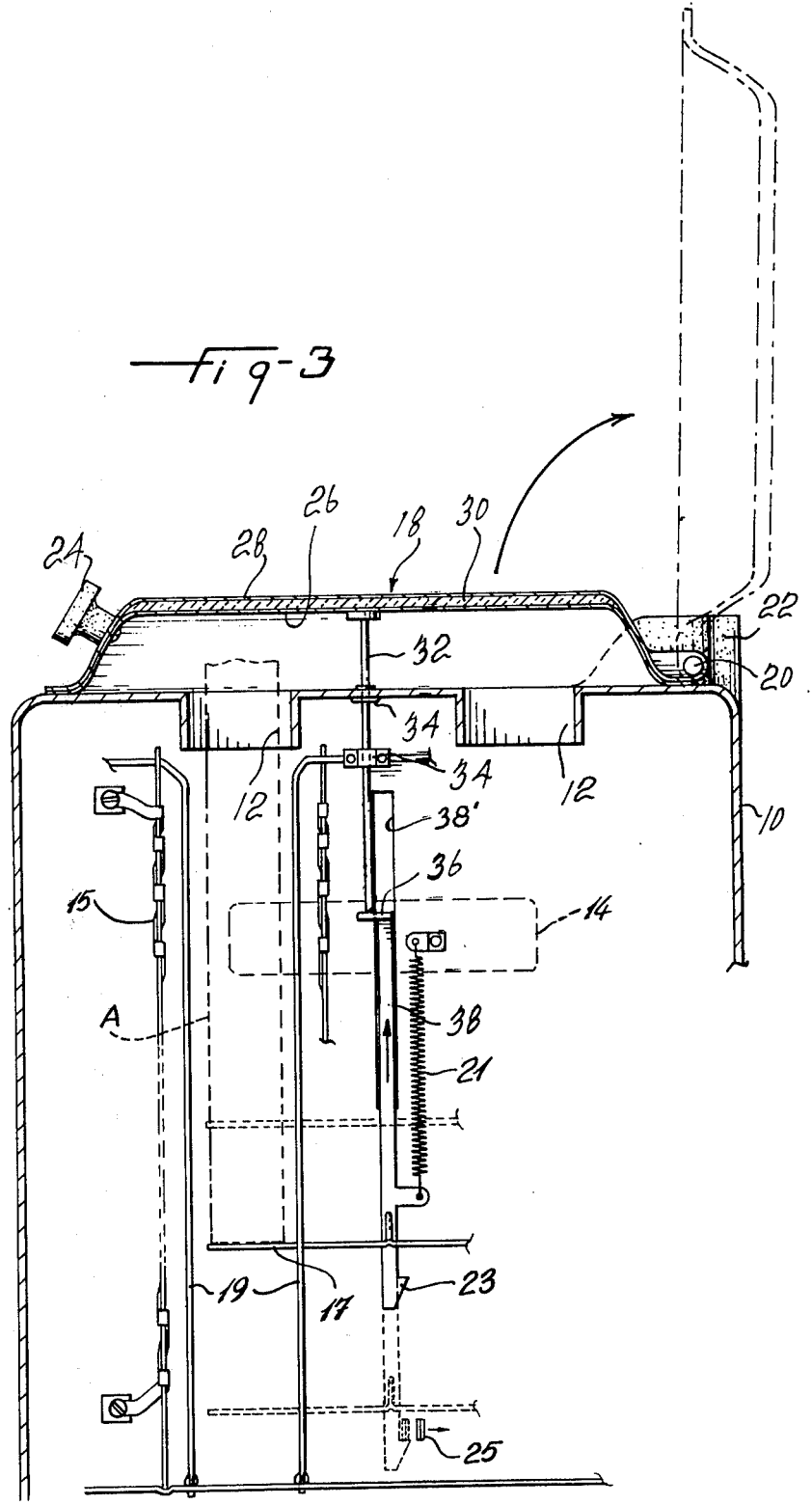
FIG. 3 illustrates a view taken along line 3—3 of FIG. 2.

Referring to the drawings, there is shown a conventional toaster 10 of the pop-up type provided with regular bread slots 12 opening at the top of the body thereof, a bread ejection control handle 14 and a bread darkness control lever 16. The toaster body has internal electric heating elements 15 and internal bread slice supports 17 for each slot, movably mounted for up-and-down movement in the toaster body. The bread slices A are guided by guide rods 19. The control handle 14 is connected to the supports through a carrying arm 36 and upright bar 38. Arm 36 extends through slot 38' in the end wall of the toaster body. Spring means 21 bias the bread slice supports 17 and the carrying arm 36 upwardly. Spring means 21 may be attached to the end wall of the toaster body and to bar 38. The supports and the carrying arm are movable between an upper and a lower limit position. Catch means, such as hook 23 at the lower end of bar 38, retain the supports 17 and arm 36 in lowered limit position and heat-responsive means, such as bi-metal 25, are adapted to release the catch means to allow upward movement of the supports and arm to their upper limit position. This construction is conventional. In accordance with the invention, the bread slots 12 are covered by a metal cover 18, which is embossed in the shape of an inverted pan and hinged on the body of the toaster by means of pins 20 rotatably mounted in a raised portion 22 of the toaster structure. The raised portion 22 extends to the back of the cover and provides a stop for preventing the cover from tipping substantially more than its normal equilibrium position when in open position, as shown in FIG. 3. The cover is provided with a handle 24 for pivoting the cover around its hinges.

The cover is preferably made of two layers of metal 26 and 28 and a layer of heat-insulating material 30, such as asbestos, is sandwiched between the two layers 26 and 28 at the top of its embossed portion.

The cover is light enough that it will be raised by the toasts when they are lifted by the regular ejecting mechanism of the toaster and the weight of the cover will not break the toasts. However, a mechanism, such as illustrated in FIG. 3, may be provided for raising the cover. The mechanism comprises an upstanding rod 32 slidably mounted within the body of the toaster through slides 34 and operated by the control handle carrying arm 36. Rod 32 is directly engageable with the arm 36 at its lower end and with the underface of the cover 18 at its upper end. Upon upward movement of the arm 36 under the action of the spring means, the rod 32 produces partial opening of the cover. The cover can thereafter be fully opened by means of handle 24.

It has been found, in practice, that the above-disclosed cover can cut down the time for toasting bread by about one-half. This represents a substantial saving of energy not only for the user, but, more importantly, on a community basis. The cover also renders the use of the toaster much safer especially as it is unfortunately often used near curtains and other inflammable material. The cover can also maintain the toasts warm for a small period of time when it is resting half-open on the toasts after operation of the toast-ejecting mechanism or after having been simply raised by the toasts themselves.

Although the invention has been disclosed with reference to a preferred embodiment, it is to be understood that other alternatives are also envisaged. For example, the cover may have any suitable shape or construction. Any suitable means may be provided for hinging the cover on the toaster. Finally, any means may be used for opening the cover when the toasts are ready.

What I claim is:

1. In an electric toaster of the pop-up type including a toaster body having bread slice-receiving slots opening at the top thereof, internal electric heating elements, internal bread slice supports for each slot, movably mounted for up-and-down movement within the toaster body, a control arm secured to said supports and extending through the wall of said toaster body, a control handle fixed to said arm externally of said toaster body, said supports and arm movable between an upper and a lower limit position, spring means biasing said supports and arm upwardly to said upper limit position, said control handle serving to manually move said supports downwardly against the bias of said spring means to their lower limit position, catch means to retain said supports in said lowered limit position, heat-responsive means releasing said catch means to allow upward movement of said supports and arm to their upper limit position, said toaster body being combined with a cover for said toast slots, consisting of a plate slightly smaller in size than the top of said toaster body, means for hingedly mounting said plate on the top of said toaster body, so as to cover the bread slots of the toaster body, said plate being embossed in the shape of an inverted pan, so as to leave a predetermined air space between the embossed portion of the cover and the top of the toaster body, said plate being made of two metal layers between which a layer of heat-insulating material is sandwiched in the embossed portion of the plate, said means for hingedly mounting said plate including stop means for holding the cover slightly past its equilibrium position when open, so as to prevent the cover from swinging all the way back, a handle secured to said cover along its edge remote from said means for hingedly mounting said plate, and an upstanding rod guided within said toaster body for linear vertical movement, having its lower end directly engageable with said arm and its upper end directly engageable with the underface of said plate, said rod causing partial opening of said cover when said supports and arm move upwardly to their upper limit position under the action of said spring means.

* * * * *